(12) United States Patent
Black et al.

(10) Patent No.: US 11,027,194 B2
(45) Date of Patent: Jun. 8, 2021

(54) FORCE FEEDBACK TO IMPROVE GAMEPLAY

(71) Applicant: Sony Interactive Entertainment Inc., Tokyo (JP)

(72) Inventors: Glenn Black, San Mateo, CA (US); Michael Taylor, San Mateo, CA (US); Javier Fernandez Rico, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 115 days.

(21) Appl. No.: 16/290,410

(22) Filed: Mar. 1, 2019

(65) Prior Publication Data
US 2020/0276499 A1    Sep. 3, 2020

(51) Int. Cl.
*A63F 13/285*    (2014.01)
*G06F 3/01*    (2006.01)
*A63F 13/245*    (2014.01)

(52) U.S. Cl.
CPC .......... *A63F 13/285* (2014.09); *A63F 13/245* (2014.09); *G06F 3/016* (2013.01)

(58) Field of Classification Search
CPC ....... G06F 3/016; A63F 13/245; A63F 13/285
See application file for complete search history.

(56) References Cited

U.S. PATENT DOCUMENTS

| | | | |
|---|---|---|---|
| 5,044,956 A * | 9/1991 | Behensky | A63F 13/06 434/45 |
| 5,691,898 A | 11/1997 | Rosenberg et al. | |
| 5,742,278 A * | 4/1998 | Chen | A63F 13/06 345/156 |
| 6,088,019 A | 7/2000 | Rosenberg | |
| 2001/0045941 A1 * | 11/2001 | Rosenberg | A63F 13/06 345/161 |
| 2004/0160415 A1 * | 8/2004 | Rosenberg | G06F 3/0383 345/156 |
| 2005/0014561 A1 * | 1/2005 | Ouchi | A63F 13/285 463/36 |
| 2006/0109256 A1 | 5/2006 | Grant et al. | |
| 2009/0184921 A1 * | 7/2009 | Scott | G06F 1/1626 345/156 |
| 2011/0256930 A1 * | 10/2011 | Jaouen | A63F 13/245 463/37 |
| 2013/0021235 A1 | 1/2013 | Umminger et al. | |
| 2015/0268725 A1 * | 9/2015 | Levesque | G06F 3/041 345/156 |

OTHER PUBLICATIONS

International Search Report and Written Opinion dated Jun. 8, 2020, from the counterpart PCT application PCT/US20/19382.

* cited by examiner

*Primary Examiner* — Steve Rowland
(74) *Attorney, Agent, or Firm* — John L. Rogitz

(57) ABSTRACT

Force feedback is applied to a computer simulation controller, such as to a joystick element or analog trigger of the controller, depending on the context of the simulation.

20 Claims, 7 Drawing Sheets

FORCE FEEDBACK TO IMPROVE GAMEPLAY

FIELD

The application relates to force feedback to improve simulation play, such as play of computer games.

BACKGROUND

Video simulation such as video gaming is growing in popularity. As understood herein, simulations are played with game controllers.

SUMMARY

As further understood herein, use of simulation controllers can be enhanced to assist the player using force feedback.

Accordingly, a device includes at least one computer memory that is not a transitory signal and that in turn includes instructions executable by at least one processor to receive a first signal from a computer simulation, and responsive to the first signal, apply a first force to at least a first manipulable mechanism on a computer simulation controller configured to control the computer simulation. The instructions are configured to receive a second signal from the computer simulation, and responsive to the second signal, apply a second force to the first manipulable mechanism on the computer simulation controller.

In non-limiting examples, the first manipulable mechanism may include a joystick or an analog trigger or a button including combinations thereof.

In some examples, the first signal can be associated with a simulated deviation from a travel path in the computer simulation, and the first force is greater than the second force. In examples, the first signal is associated with a simulated presence over a first target type and the second signal is associated with a simulated presence over a second target type, and the first force is greater than the second force.

In another aspect, a method includes applying, using a force feedback mechanism, a first force to at least a portion of a computer simulation controller based at least in part on a determination that a computer simulation comprises a first context. The method also includes applying, using the force feedback mechanism, a second force to at least the portion of a computer simulation controller based at least in part on a determination that the computer simulation comprises a second context.

In another aspect, a system includes at least one computer simulation controller, at least one computer simulation console configured to present at least one computer simulation responsive to signals from the computer simulation controller, and at least one force feedback mechanism. The force feedback mechanism is configured to provide a first force on at least a portion of the computer simulation controller responsive to a first context of the computer simulation and a second force on the portion of the computer simulation controller responsive to a second context of the computer simulation.

The details of the present application, both as to its structure and operation, can best be understood in reference to the accompanying drawings, in which like reference numerals refer to like parts, and in which:

DETAILED DESCRIPTION

Figure 1:
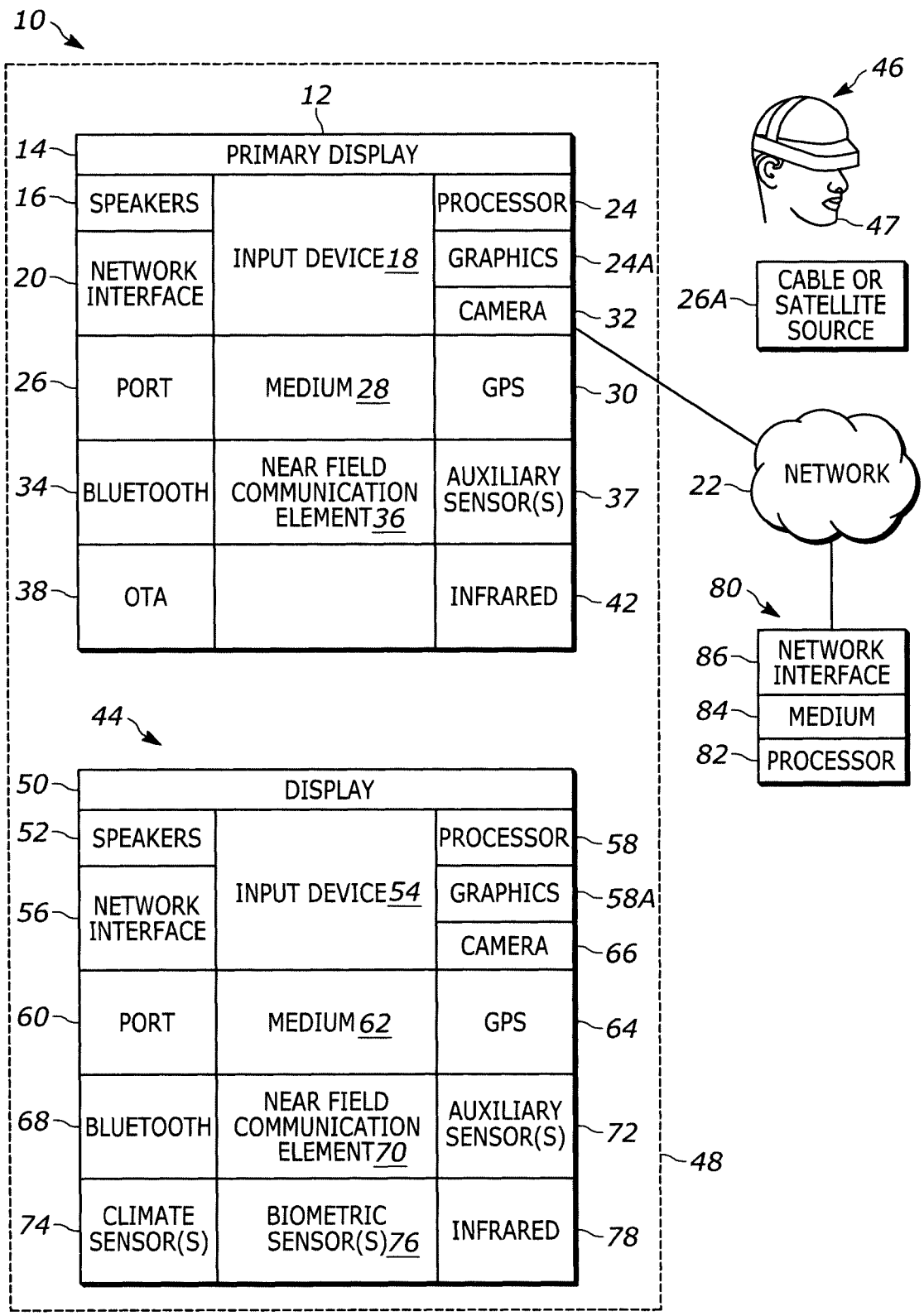
FIG. 1 is a block diagram of an example system including an example in accordance with present principles.

This disclosure relates generally to computer ecosystems including aspects of consumer electronics (CE) device networks such as but not limited to computer simulation networks such as computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
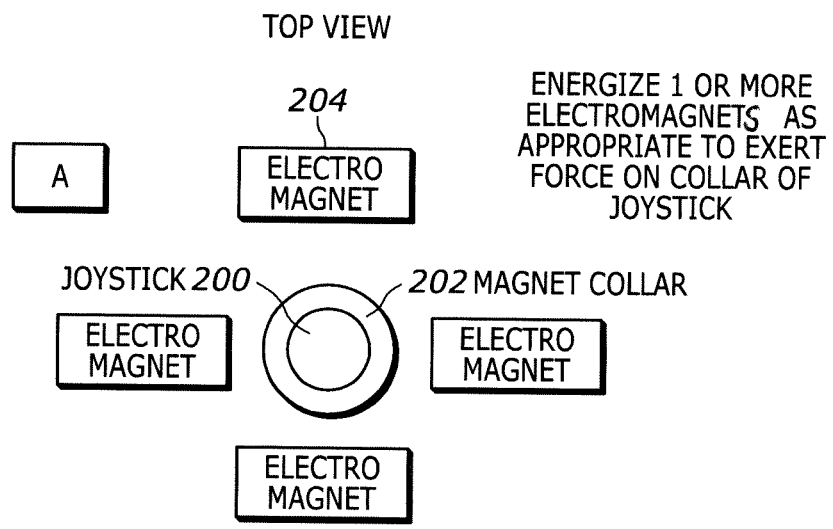
FIG. 2 is a schematic top view of an example non-limiting simulation controller with a joystick and electromagnets to provide force feedback to the joystick.

Now referring to FIG. 2, a first force feedback mechanism is shown for providing resistance force to movement of a joystick 200 that may be implemented in a computer simulation controller according to logic described further below. The first force feedback mechanism may include a collar 202 around the joystick 200 that is made of a permanently magnetic material. The mechanism may also include plural electromagnets 204 (four shown in FIG. 2 spaced 90 degrees from each other) that can be energized individually or in appropriate combinations to prove a magnetic force on the collar 202 and, hence, joystick 200. For example, all four electromagnets 204 may be energized to provide resistive force to motion of the joystick 200 in any direction, whereas two adjacent electromagnets may be energized to provide resistive force to motion of the joystick in one general direction but not in another general direction.

Figure 3:
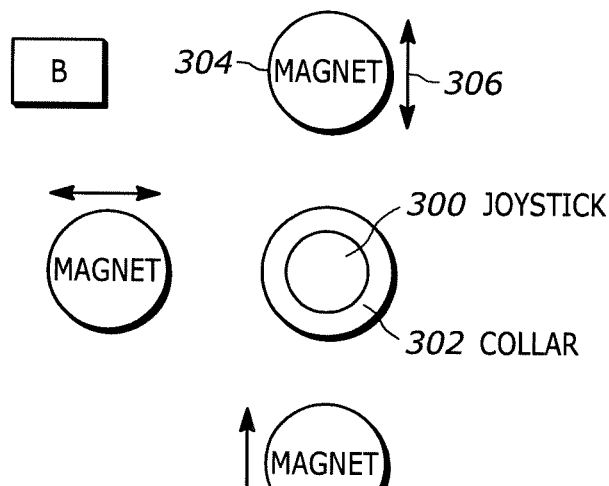
FIG. 3 is a schematic top view of an example non-limiting simulation controller with a joystick and movable permanent magnets to provide force feedback to the joystick.

FIG. 3 illustrates a second force feedback mechanism for providing resistance force to movement of a joystick 300 that may be implemented in a computer simulation controller according to further description below. The first force feedback mechanism may include a collar 302 around the joystick 300 that is made of a permanently magnetic material. The mechanism may also include plural permanent magnets 304 (four shown in FIG. 3 spaced 90 degrees from each other) that can be individually or in appropriate combinations moved toward and away the joystick as indicated by the arrows 306 to prove a magnetic force on the collar 302 and, hence, joystick 300. For example, all four magnets 304 may be moved closer to the joystick to provide resistive force to motion of the joystick 300 in any direction, whereas two adjacent electromagnets may be moved closer to the joystick than the remaining two magnets to provide resistive force to motion of the joystick in one general direction but not in another general direction.

Figure 4:
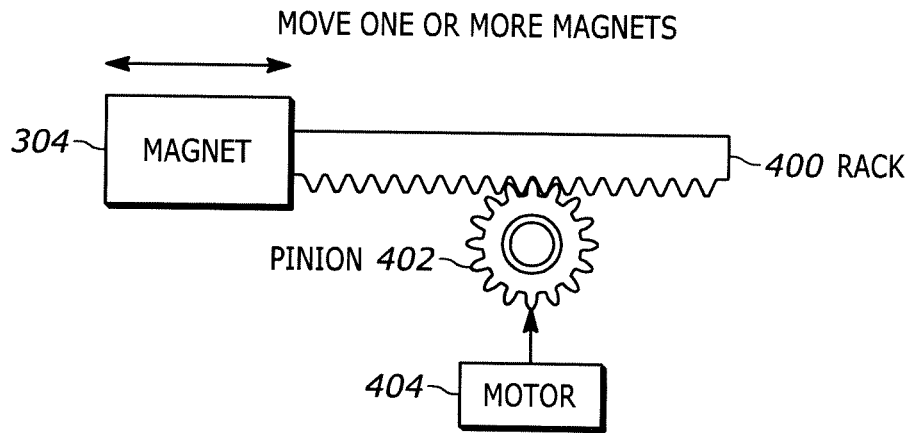
FIG. 4 is a schematic diagram of an example moving mechanism for a magnet in FIG. 3.

In the non-limiting example shown in FIG. 4, a magnet 304 may be coupled to a rack 400 that is moved translationally by a pinion 402 driven by a motor 404 such as a stepper motor. The motor can be energized in the appropriate direction to move the magnet through the rack-and-pinion mechanism.

Figure 5:
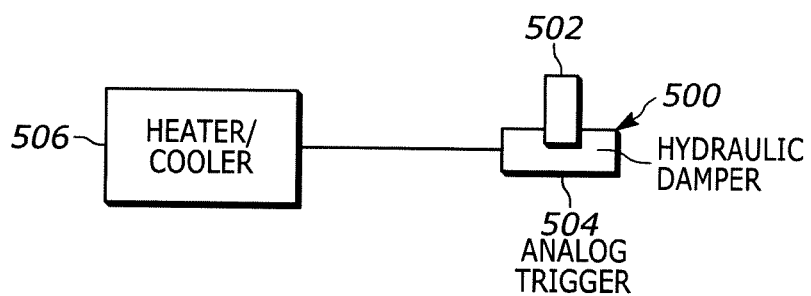
FIG. 5 is a schematic diagram of an example non-limiting simulation controller with an analog trigger and a hydraulic damper providing force feedback to the analog trigger.

FIG. 5 shows yet another force feedback mechanism for providing force feedback when a trigger 500 is depressed, e.g., by a player of a computer simulation to emulate shooting a weapon. The trigger 500 may include a plunger 502 that can be pressed into a fluid-filled housing 504, the temperature and/or pressure of which may be controlled as appropriate for the desired resistive force against the plunger 502 by a heater/cooler 506. The heater/cooler 506 may be an electric or hydraulic device.

Figure 11:
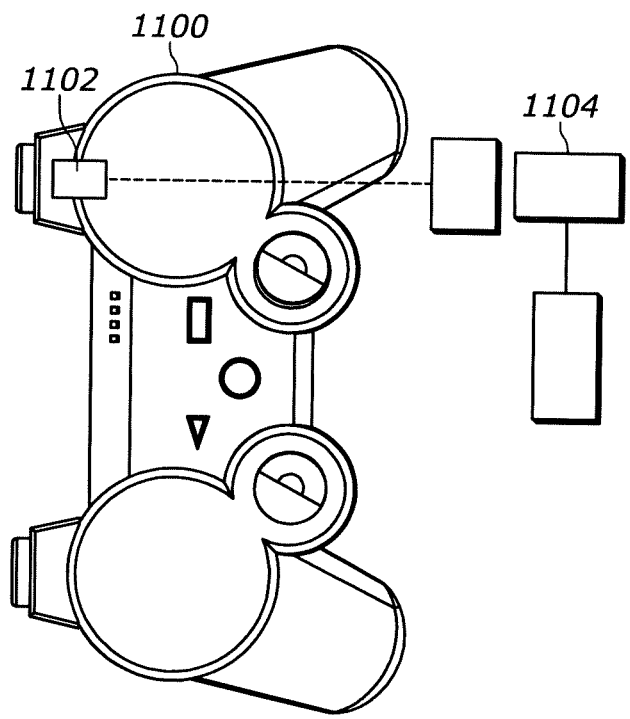
FIG. 11 is a schematic view of an example non-limiting simulation controller with a joystick and motor to provide force feedback to the joystick.

Turning briefly to FIG. 11, yet another force feedback mechanism is shown in which a computer simulation controller 1100 include a manipulable control 1102 such as a joystick or trigger. A motorized force feedback mechanism 1104 can be coupled to the control 1102 to provide resistive force to the control 1102 according to logic below. The motorized force feedback mechanism 1104 may be implemented by a potentially piezoelectric haptic trigger and motor that create resistance to motion of the control 1102 but that do not completely stiffen the control 1102.

Figure 12:
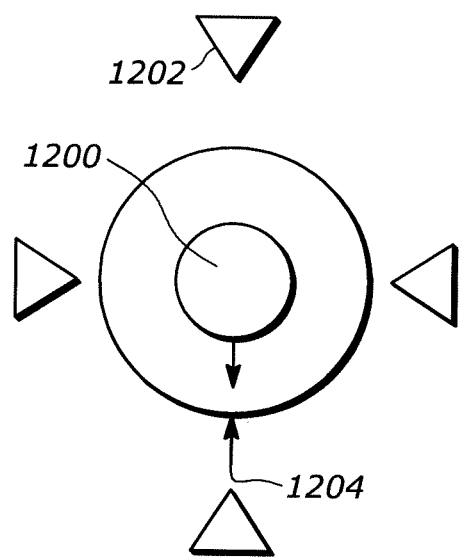
FIG. 12 is a schematic diagram related to FIG. 11 illustrating a motor-implemented force feedback mechanism.

In an embodiment shown in FIG. 12, the control 1102 may include a rod the end of which terminates in a ball 1200 within the housing of the controller 1102. The ball may be coupled to the motor of the mechanism 1104. Only a single omni-directional motor 1202 may be used, or two motors or more per joy stick (four shown in FIG. 12) may be used to provide resistance to joystick motion in various directions as indicated by the arrows 1204. Or, a coupling such as the collars described above but not necessarily magnetic may be provided around the ball and four motors provided coupled to the ball to exert a force in various directions against motion of the ball as required by logic below. Alternatively, the ball 1200 may be immersed in a ferrite powder, and permanent or electro-magnets used as described above in relation to FIGS. 2 and 3 to essentially excite the powder and thereby provide resistance force to motion of the joystick.

While the disclosure above relates to joysticks and triggers, it is to be understood that present principles can apply to any control on a computer simulation controller.

Figure 6:
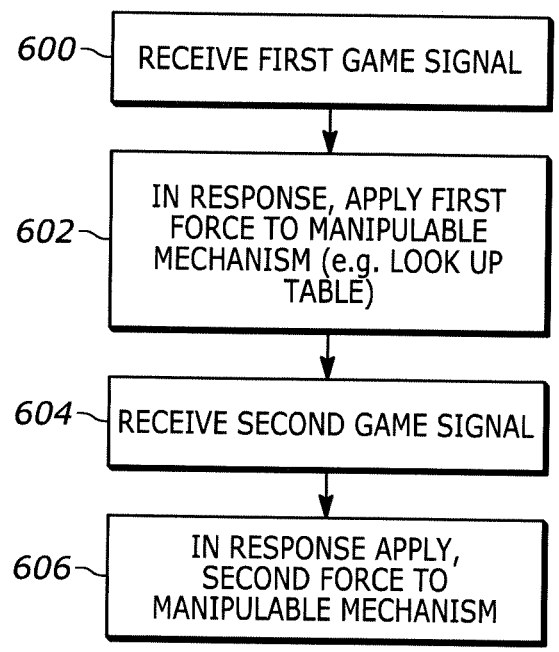
FIG. 6 is a flow chart of example logic consistent with present principles.

Returning to FIG. 6, example logic for using any of the force feedback mechanisms described herein to provide resistive force to a control is shown. Simulation designers may provide force specifications for resistance depending on what is occurring in the simulation. Or, a simulation console or other computer may derive force specifications for resistance depending on what is occurring in the simulation using machine learning for a particular user, and/or by using other people's simulation play as a training set for a machine learning algorithm.

Commencing at block 600, a first signal from a computer simulation is received indicating an event in a simulation being played using any of the controllers herein with force feedback mechanisms. At block 602, responsive to the first signal, a first force is applied to a manipulable mechanism on a computer simulation controller configured to control the computer simulation. This may be done by correlating the first signal to a particular resistive force (including direction the force should be applied) using a lookup table.

Moving to block 604, a second signal from the computer simulation is received, and at block 606 in response a second, different force (including direction) is applied to the manipulable mechanism on the computer simulation controller.

Figure 7:
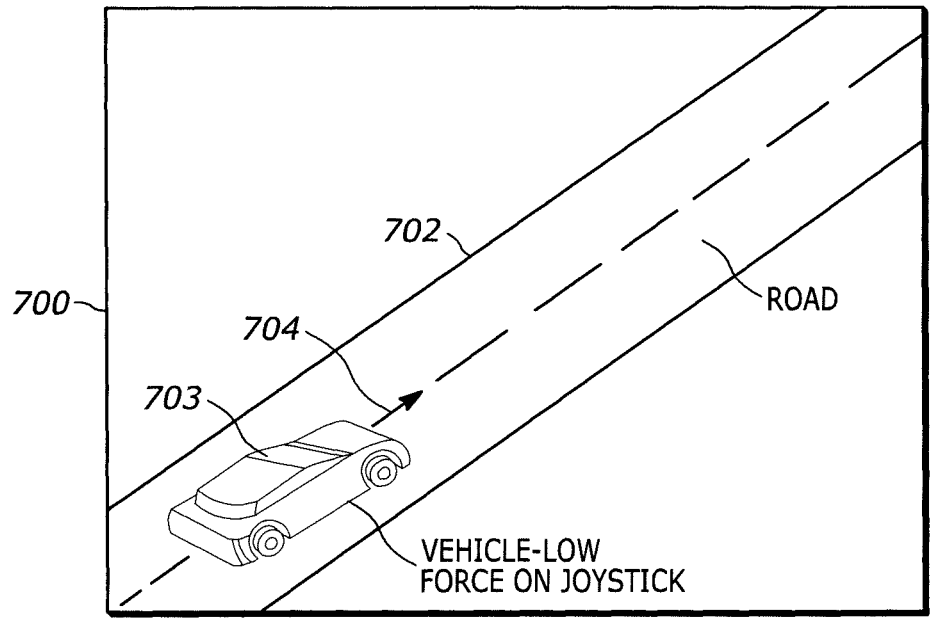
FIGS. 7 and 8 are screen shots of simulation play contexts in which one of the contexts gives rise to force feedback and the other context does not.
Figure 8:
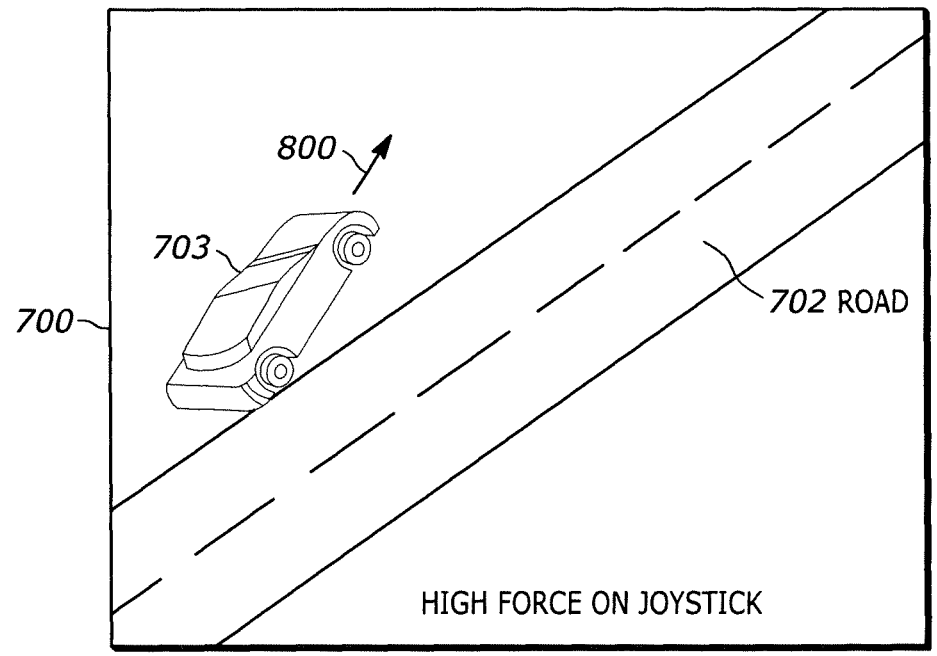

FIGS. 7-10 provide example use cases that implement the structures and logic described above. As shown in FIGS. 7 and 8, a computer simulation may be presented on a display 700 such as any of the displays described herein. The simulation may include a road 702 along which a simulated vehicle 703 is to drive, as indicated by the arrow 704 in FIG. 7. In this scenario, a signal indicating that the simulated vehicle is being correctly driven down the road 702 may result in the force feedback mechanism being actuated or controller to provide a low force feedback to, e.g., a joystick on a controller that a player uses to drive the simulated vehicle 703.

However, as shown by the arrow 800 in FIG. 8, should the player drive off the road 702, the force feedback mechanism can be actuated to apply a high force to resist motion of the joystick in any direction except motion necessary to turn the vehicle 703 back onto the road 702. In this way, force feedback aids the player in correctly moving the joystick by making it easier to move the joystick only in the "correct" direction.

Figure 9:
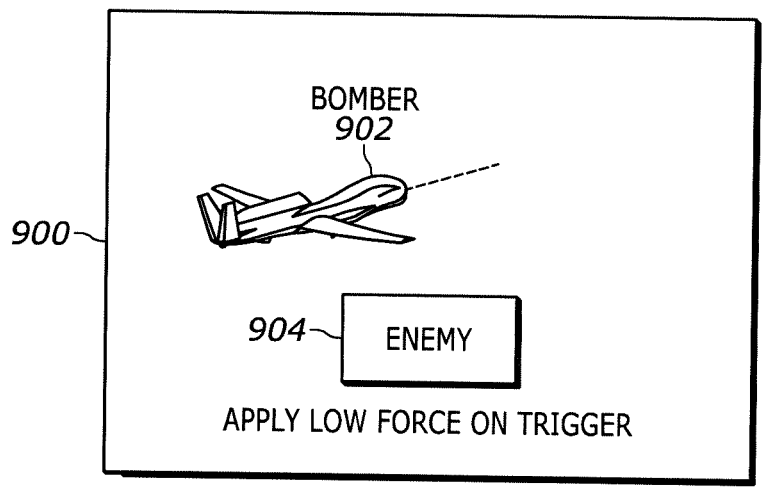
FIGS. 9 and 10 are screen shots of additional simulation play contexts in which one of the contexts gives rise to force feedback and the other context does not.
Figure 10:
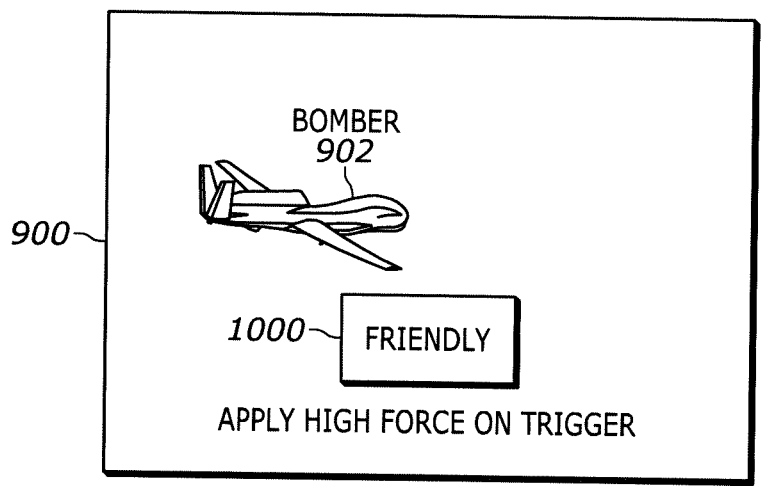

FIGS. 9 and 10 illustrate another use case in which a computer simulation on a display 900 depicts a warplane 902 flying over targets. In FIG. 9 the simulation generates a signal indicating that the warplane 902 is over a target 904 of a first type, in this case, an enemy target. Responsive to the signal from the simulation, the force feedback mechanism may be actuated to provide a first resistance to a controller trigger manipulable to simulate dropping a weapon onto the target. When the target is an "enemy" target the force feedback may be low, to ease pushing the trigger.

On the other hand, when the simulation signal indicates that a target 1000 in FIG. 10 is of a second type, e.g., a friendly target, the force feedback mechanism may be actuated to provide a second resistance to the trigger. When the target is a friendly target the force feedback may be high, to make it more difficult to push the trigger. In this way, force feedback aids the player in correctly using the trigger.

It will be appreciated that whilst present principals have been described with reference to some example embodiments, these are not intended to be limiting, and that various alternative arrangements may be used to implement the subject matter claimed herein.

What is claimed is:

1. A device comprising:
   at least processor programmed with instructions to:
   receive a first signal from a computer simulation;
   responsive to the first signal, apply a first force to at least a first manipulable mechanism on a computer simulation controller configured to control the computer simulation;
   receive a second signal from the computer simulation; and
   responsive to the second signal, apply a second force to the first manipulable mechanism on the computer simulation controller, wherein the first signal is associated with a simulated presence over a first target type and the second signal is associated with a simulated presence over a second target type, and the first force is greater than the second force.

2. The device of claim 1, wherein the first and second forces are generated by a force feedback mechanism comprising plural force generators juxtaposed with the first manipulable mechanism, the instructions being executable to:
   actuate all of the force generators to provide resistive force to motion of the first manipulable mechanism in a first number of directions; and
   actuate fewer than all of the force generators to provide resistive force to motion of the first manipulable mechanism in a second number of directions less than the first number of directions.

3. The device of claim 1, comprising at least one display device configured for control by the at least one processor to present the computer simulation.

4. The device of claim 1, wherein the first manipulable mechanism comprises at least one joystick.

5. The device of claim 1, wherein the first manipulable mechanism comprises at least one analog trigger or button.

6. The device of claim 1, wherein the first signal is associated with a simulated deviation from a travel path in the computer simulation, and the first force is greater than the second force.

7. The device of claim 5, wherein the first and second forces are generated by a plunger coupled to the trigger or button and disposed in a fluid, the instructions being executable to establish at least one parameter of which fluid for a demanded resistive force.

8. A method, comprising:
   applying, using a force feedback mechanism, a first force to at least a portion of a computer simulation controller based at least in part on a determination that a computer simulation comprises a first context; and
   applying, using the force feedback mechanism, a second force to at least the portion of a computer simulation controller based at least in part on a determination that the computer simulation comprises a second context;
   wherein the force feedback mechanism comprises plural force generators juxtaposed with the portion of the computer simulation controller, and the method comprises:
   actuating all of the force generators to provide resistive force to motion of the portion of the computer simulation controller in a first number of directions; and
   actuating fewer than all of the force generators to provide resistive force to motion of the portion of the computer simulation controller in a second number of directions less than the first number of directions.

9. The method of claim 8, wherein the second force is zero and the first force is greater than zero.

10. The method of claim 8, wherein the force feedback mechanism comprises at least one magnet.

11. The method of claim 8, wherein the force feedback mechanism comprises at least one motor.

12. The method of claim 8, wherein the force feedback mechanism comprises at least one fluid.

13. The method of claim 8, wherein the portion of the computer simulation controller comprises a joystick.

14. The method of claim 8, wherein the portion of the computer simulation controller comprises a trigger or a button.

15. The method of claim 8, wherein the first context is associated with a simulated deviation of a land vehicle from a travel path along a road in the computer simulation, and the first force is greater than the second force.

16. A method, comprising:
applying, using a force feedback mechanism, a first force to at least a portion of a computer simulation controller based at least in part on a determination that a computer simulation comprises a first context; and
applying, using the force feedback mechanism, a second force to at least the portion of a computer simulation controller based at least in part on a determination that the computer simulation comprises a second context;
wherein the first context is associated with a simulated presence over a first target type and the second context is associated with a simulated presence over a second target type, and the first force is greater than the second force.

17. A system comprising:
at least one computer simulation controller;
at least one computer simulation console configured to present at least one computer simulation responsive to signals from the computer simulation controller;
at least one force feedback mechanism configured to provide a first force on at least a portion of the computer simulation controller responsive to a first context of the computer simulation and a second force on the portion of the computer simulation controller responsive to a second context of the computer simulation; and
at least one processor configured to execute instructions, wherein
the force feedback mechanism comprises plural force generators juxtaposed with the portion of the computer simulation controller, the instructions being executable to:
actuate all of the force generators to provide resistive force to motion of the portion of the computer simulation controller in a first number of directions; and
actuate fewer than all of the force generators to provide resistive force to motion of the portion of the computer simulation controller in a second number of directions less than the first number of directions.

18. The system of claim 17, wherein the first context is associated with a simulated deviation from a travel path in the computer simulation, and the first force is greater than the second force.

19. The system of claim 17, wherein the first context is associated with a simulated presence over a first target type and the second context is associated with a simulated presence over a second target type, and the first force is greater than the second force.

20. The system of claim 17, wherein the portion of the computer simulation controller comprises a joystick or a trigger or a button.

\* \* \* \* \*